United States Patent
Jacobson (10) Patent No.: US 8,176,354 B2
(45) Date of Patent: May 8, 2012

(54) WAVE PIPELINE WITH SELECTIVELY OPAQUE REGISTER STAGES

(75) Inventor: Hans M. Jacobson, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 12/731,881

(22) Filed: Mar. 25, 2010

(65) Prior Publication Data
US 2011/0239036 A1     Sep. 29, 2011

(51) Int. Cl.
*G06F 1/04*     (2006.01)
(52) U.S. Cl. .......... 713/600; 712/219; 713/323
(58) Field of Classification Search .......... 712/219; 713/323, 600
See application file for complete search history.

(56) References Cited

U.S. PATENT DOCUMENTS

| | | | |
|---|---|---|---|
| 6,383,579 B1 | 5/2002 | Piazza | |
| 6,609,209 B1 | 8/2003 | Tiwari et al. | |
| 7,076,682 B2 | 11/2005 | Jacobson | |
| 7,051,294 B2 * | 5/2006 | Masleid | 716/108 |
| 7,469,357 B2 * | 12/2008 | Abernathy et al. | 713/600 |

* cited by examiner

*Primary Examiner* — Albert Wang
(74) *Attorney, Agent, or Firm* — Law Office of Charles W. Peterson, Jr.; Kenneth R. Corsello, Esq.; William J. Stock, Esq.

(57) ABSTRACT

A selectively synchronous wave pipeline segment and an integrated circuit (IC) including the segment. The segment includes a normally opaque input stage and output stage and multiple internal stages that are normally transparent. A programmable local clock control circuit provides internal stage clock selection control to internal stages. The internal clock selection control determines whether each internal pipeline stage is gated opaque by a local clock. The programmable local clock control circuit is programmed to allows data items to propagate as data waves in a wave pipeline until each wave reaches a point where beyond, a race condition is likely to exist. Multiple pipeline data items pass as data waves between input and said output stage selectively unclocked.

25 Claims, 11 Drawing Sheets

WAVE PIPELINE WITH SELECTIVELY OPAQUE REGISTER STAGES

BACKGROUND OF THE INVENTION

1. Field of the Invention

The present invention generally relates to synchronous integrated circuits and more particularly to reducing power consumption in a synchronous pipeline circuit.

2. Background Description

Semiconductor technology and chip manufacturing advances have resulted in a steady increase of on-chip clock frequencies, the number of transistors on a single chip and the die size itself accompanied by a corresponding decrease in chip supply voltage. Generally, the power consumed by a given clocked unit (e.g., latch, register, register file, functional unit and etc.) increases linearly with the frequency of switching within the unit. Thus, not withstanding the decrease of chip supply voltage, chip power consumption has increased as well.

Chip and system level cooling and packaging costs have escalated as a natural result of this increase in chip power. It is crucial for low end systems (e.g., handhelds, portable and mobile systems) to reduce net energy consumption to extend battery life but, without degrading performance to unacceptable levels. In current microprocessor designs, over 70% of the power consumed is attributable to the clock alone. In a typical synchronous design, over 90% of this power is consumed in local clock splitters/drivers and latches.

A typical pipeline is a complex logic function arranged in a series of multiple logic functions or elements in a logic path with pipeline data traversing each element. Since data has a determinable delay in each element, multiple data may be simultaneously sequentially traversing the pipeline. Pipelines may be buffered or unbuffered. In buffered pipelines, pipeline logic is interrupted by registers that form boundaries to segment the logic into short paths, no longer than a single clock cycle long. Unbuffered pipelines, also known as wave pipelines, are several clock cycles long, i.e., the propagation delay through the entire pipeline takes multiple cycles and data items propagate freely through from one end to the other.

A first-in first-out (FIFO) register is a simple example of a sequential/buffered pipeline. A FIFO is an M stage by N bit register file with each of M stages including an N latch register, at least one latch for each data bit. Normally, all of the stages are simultaneously clocked by a single global clock, passing data items from one stage to the next with each clock. An N-bit data item from an input environment enters a first stage on one clock cycle and, substantially the same N-bit word exits the last stage unchanged at an output environment M clock cycles later. Thus, a FIFO may be used as an M-clock cycle delay for example. On each clock cycle (e.g., every rising or falling clock edge) each N-bit word in the FIFO advances one stage. In a typical more complicated pipeline example, logic separates some or all of the stages, e.g., a Multiply/Add-Accumulate (MAAC) unit or other state of the art pipeline microprocessors functional unit.

For a 1 gigahertz (1 GHz) clock, for example, each clock cycle is 1 nanosecond (1 ns) long. Thus in this example, logic in each segment must have a propagation delay shorter than 1 ns. A register stage is (or the latches in the stage are) normally referred to as transparent, when the stage passes data from its input to its output. The same stage is normally referred to as opaque when data is latched in it, i.e., regardless of input the opaque latch is holding its output constant, such that the input does not pass to its output. So for example, in a typical pipeline based on master/slave latches, clocked by an ungated clock, stages are normally opaque and alternate stages are pulsed transparent in alternate clock states, e.g., even stages held opaque and odd stages pulsed transparent when the clock is high and vice versa when the clock is low. While master and slave latches are really separate latch stages of a pipeline, they are typically collectively referred to paired as a stage.

Clock gating techniques, selectively turning the clock on and off, have been used to reduce the number of pipeline clock pulses in synchronous designs such as microprocessors, thereby reducing clock related power consumption. However, the local clock is still pulsed for each stage, at least once for each data item propagating through the pipeline, to minimize the risk of data races from data items passing through the latches of adjacent pipeline stages.

For the same 1 GHz clock example, an unbuffered pipeline is an n nanosecond long path, i.e., n clock cycles long. In an ideal design where the logic is well behaved and the path is free from race conditions, each datum or data item (i.e., all bits) traversing the path (a wave) arrives at the same point at the end of each of the n clock cycles. Wave pipelines allow multiple temporally spaced data (waves) to traverse the entire pipeline simultaneously, uninterrupted by latches, avoiding clock related power consumption. Ideally, n data items may be simultaneously traversing the path, each entering the path at the beginning of a clock cycle and, n cycles later, each exiting at the end of a clock cycle. In practice, however, logic is seldom well behaved and race conditions always exist to some extent because some bits have longer logic paths than others.

Consequently, wave pipelines have required strict control of short and long path delays in data path logic to avoid data races, i.e., to prevent leading edges from one wave from catching trailing edges of another downstream edge. Further, prior art wave pipelines have been precluded from using Dynamic Voltage and Frequency Scaling (DVFS) because short and long path delays scale differently. Also, DVFS may enhance effects of manufacturing variations, skew, jitter, and switching current (dI/dt) noise. Further, without path latches, functional testing path logic is difficult if not impossible. Consequently, the pipeline may not be stopped without inserting additional costly buffers/muxes.

U.S. Pat. No. 7,076,682, "Synchronous Pipeline With Normally Transparent Pipeline Stages" to Hans M. Jacobson, issued Jun. 11, 2006, assigned to the assignee of the present invention and incorporated herein by reference describes another pipeline approach. Jacobson teaches gating pipeline stages normally transparent. Internal stages are gated opaque only when necessary to separate data items and avoid race conditions from closely (temporally) spaced pipeline data, e.g. two successive clock cycles. However, race conditions seldom occur at every internal stage, even for adjacent pipeline data items. So, even with Jacobson, some stage clocking may be eliminated.

Thus, there exists a need for dynamically selected latch stage clocking for synchronous pipelines that allows data items to propagate as data waves in a wave pipeline until each wave reaches a point where beyond, a race condition is likely to exist.

SUMMARY OF THE INVENTION

It is a purpose of the invention to minimize clock power in synchronous designs;

It is another purpose of the invention to increase clock gating flexibility;

It is yet another purpose of the invention to minimize synchronous design power without reducing pipeline operating frequency.

The present invention relates to a selectively synchronous wave pipeline segment and an integrated circuit (IC) including the segment. The segment includes a normally opaque input stage and output stage and multiple internal stages that are normally transparent. A programmable local clock control circuit provides internal stage clock selection control to internal stages. The internal clock selection control determines whether each internal pipeline stage is gated opaque by a local clock. The programmable local clock control circuit is programmed to allow data items to propagate as data waves in a wave pipeline until a wave reaches a point where beyond, a race condition is likely to exist. Multiple pipeline data items pass as data waves between input and said output stage selectively unclocked.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1A:
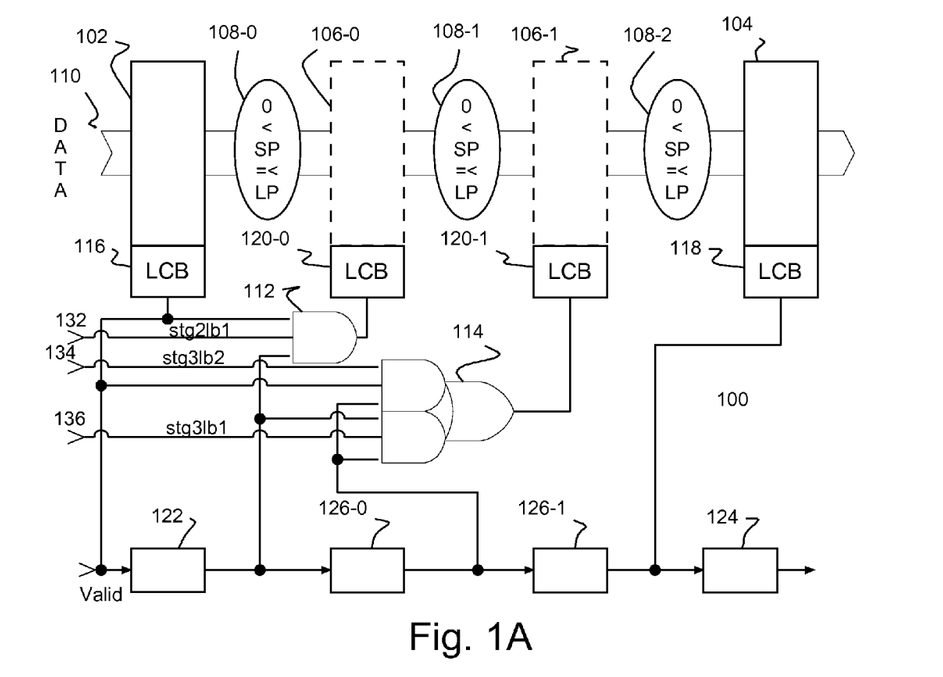
FIG. 1A shows a simple cross sectional example of a preferred normally transparent wave pipeline according to a preferred embodiment of the present invention.

Turning now to the drawings and, more particularly, FIG. 1A shows a simple cross sectional example of a preferred normally transparent wave pipeline 100 according to a preferred embodiment of the present invention. As with a typical prior art wave pipeline, normally opaque stages 102, 104 bound the pipeline 100. However, a preferred gatable wave pipeline 100 includes N−1 normally transparent internal pipeline register stages 106-0, 106-1, separating N segments 108-0, 108-1, 108-2. Unless there is a potential race condition for pipeline data in one of the segments 108-0, 108-1, 108-2, data 110 entering the pipeline 100 at normally opaque stage 102 traverses pipeline logic through segments 108-0, 108-1, 108-2 without latching in the normally transparent internal pipeline register stages 106-0 and 106-1.

It should be noted that although this example shows three pipeline logic segments 108-0, 108-1, 108-2 separated by two (2) normally transparent internal or intermediate pipeline register stages 106-0 and 106-1, this is for example only. However, the present invention has application to separating any length wave pipeline into any number of segments 108-0-108-(N−1) with normally transparent internal register stages 106-0-106-(N−2), where N is 2 or more and is 3 in this example.

Programmable select logic 112, 114 at each internal stage 106-0, 106-1 determines whether a race condition may exist based on previous characterization of upstream segment(s) 108-0 and/or 108-1-108-2 and current stage 102, 106-0, 106-1 contents and any current downstream stalls. The select logic 112, 114, for example, handles stalls separately, e.g., as described in U.S. Pat. No. 7,065,665, "Interlocked Synchronous Pipeline Gating" to Jacobson et al., issued Jun. 20, 2006, assigned to the assignee of the present invention and incorporated herein by reference. A stalled stage is held opaque and acts, essentially, as a normally opaque or boundary stage. Further, because as long as the stage is stalled, it is a race condition for any data item passing through the next immediate stage. Thus, the pipeline described herein below is treated and described as unstalled for simplicity of explanation. It is understood however, that the preferred select logic 112, 114 allow waves to propagate normally and adjusts propagation for downstream stalls.

Each stage 102, 104, 106-0, 106-1 includes a local clock buffer 116, 118, 120-0 and 120-1. Preferably, clock buffers 116 and 118 gate respective opaque register normally opaque and selectively gate each register transparent when valid data 110 is provided as an input. A corresponding valid data latch 122, 124, 126-0, 126-1 indicates the progression of the edge of a data wave, i.e., the long path (LP) or trailing edge. Clock buffers 120-0 and 120-1 maintain normally transparent internal pipeline register stages 106-0 and 106-1 transparent unless programmable select logic 112, 114 determines that a race condition may exist, i.e., short path (SP) bits from an upstream wave (i.e., the leading edge) overtaking the trailing edge of a preceding downstream wave. To prevent race conditions, a single normally transparent internal pipeline register stage 106-0, 106-1 may be gated opaque between adjacent data for a single cycle just prior to the point where the race would occur. Essentially, this re-synchronizes the leading edge of the newer, upstream data item flattening the upstream wave.

Ideally, SP=LP and for each M-bit wide data item entering each pipeline logic segment 108-0, 108-1, 108-2, all M bits exit simultaneously. However, that is seldom if ever the case. For example, adding two eight bit hexadecimal numbers, 01 and FF, in a simple ripple carry adder, e.g., 108-0, has multiple paths. The shortest path (SP) is the simple addition of the two least significant bits (LSB); while the carry rippling through the seven remaining bits to emerge as a carry out is the longest path (LP).

In a simple multiplier built from multiple series Carry Save Adders (CSAs), for example, each CSA selectively adds the results of prior upstream CSAs. Providing two pairs of numbers for multiplication can cause a race condition in the multiplier (e.g., organized as a preferred gatable wave pipeline 100 with the internal stages 106-0-106-2 held transparent) when, for example, a LSB bit or bits from one data item propagating through a short path in one CSA 108-0 catches a carry bit or bits from a prior (downstream) data item, e.g., in 108-1.

So, for example, new values could be provided continually to a wave pipeline of multiple CSA stages 108-0, 108-1, 108-2, provided the values are separated in time at least by the LP carry propagation delay. However, if the simple LSB add SP is short enough, e.g., less than half the LP, the LSB from the most recent add 108-0 may propagate downstream through the previous add 108-1 before or with the LP carry for the previous downstream add, i.e., a race condition occurs.

If however, the spacing between values is longer than the SP in two adjacent waves, no race occurs. Further, since path delays typically vary with operating conditions and because short and long path delays scale differently, Dynamic Voltage and Frequency Scaling (DVFS) can change where race conditions occur. Traditional wave pipelines allow tight spacing by tightly constraining short path delays to avoid races. Traditional gated pipelines avoid tight timing constraints on short paths but unnecessarily consume clock power since every latch has to clock to propagate the data. The present invention allows tighter spacing in the pipeline data not by constraining short path delays but by selectively clocking normally transparent register stages 106-0-106-2 opaque between pipeline data prior to the point where a race is likely to occur. Further, the present invention provides a super set of a broad spectrum of pipeline techniques in a single wave pipeline with normally transparent register stages 106-0-106-1, that can selectively implement transparent clock gating (TCG) and opaque clock gating (OCG). In particular, the programmable select logic 112, 114 in downstream stages monitor upstream stages for data presence and the potential for a race condition.

Figure 1B:
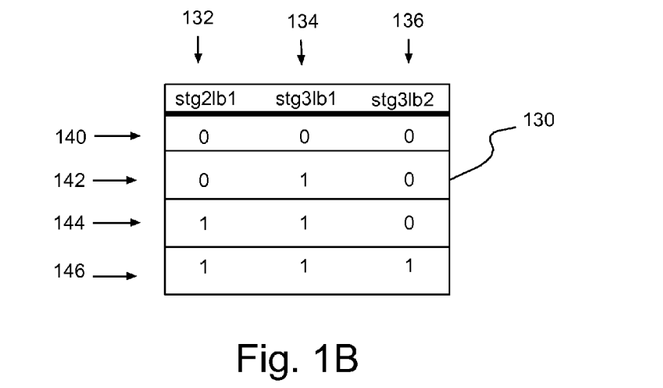
FIG. 1B shows a truth/selection table for select logic implementing gating control for providing a super-set of all transparent gating techniques by the preferred normally transparent wave pipeline.

FIG. 1B shows a truth/selection table 130 for programming programmable select logic 112, 114 in implementing gating control 132, 134, 136 for the preferred normally transparent wave pipeline 100 of FIG. 1A. Thus, programming programmable select logic 112, 114 provides a super-set of all gating techniques. Typically, the normally transparent registers 106-0-106-1 are located to be separated by long path logic segments 108-0, 108-1, 108-2, that are 1 clock cycle long and, preferably, with equal short and long paths for each segment 108-0, 108-1, 108-2.

Where a race condition may occur depends both on the separation between two sequential pipeline data wavefronts (i.e. the number of clock cycles between the two) and the short path in each segment. Expressing the short path as a fraction of a clock cycle (or long path), $0.0<SP<1.0$, one may locate the segment(s) 108-0, 108-1, 108-2 where unclocked race conditions occur. By selectively clocking opaque the intermediate transparent stage 106-0, 106-1 prior to that segment 108-0, 108-1, 108-2, the opaque stage 106-0 and 106-1 separates the two pipeline data wavefronts, flattening the upstream wave and restarting the progression of the upstream wavefront at that stage.

So with reference to truth/selection table 130, if the short path is at least ⅔ LP, race conditions cannot occur, and the programming 140 indicates that it is unnecessary to clock either normally transparent register stage 106-0-106-1. If the short path is shorter, but at least ½ LP, race conditions cannot occur in the first normally transparent register stage 106-0; and only when back to back data are in the pipeline 100, is it necessary to clock the other normally transparent register stage 106-1 opaque, and the programming 142 indicates/selects that. If the short path is shorter still, but at least ⅓ LP, back to back data can cause race conditions at each normally transparent register stage 106-0-106-1; and when back to back data are in the pipeline 100, it is necessary to clock both normally transparent register stages 106-0-106-1 opaque, and the programming 144 indicates/selects that. Finally, the programming 146 indicates/selects that whenever the short path is shorter than ⅓ LP, a bubble (two data, not back to back) can cause race conditions at the second normally transparent register stage 106-1; back to back data can cause race conditions at each normally transparent register stage 106-0-106-1; and when two data items are in the pipeline 100, it is necessary to clock both normally transparent register stages 106-0-106-1 opaque accordingly.

It should be noted, that normal path delays in each segment 108-0, 108-1, 108-2 are seldom matched to each other. Moreover, short path signals in one segment may not be, and very likely are not, aligned with short paths of the next, subsequent segment. For example, the individual short path of each segment could be 0.25 LP yielding a combined short path of 0.75 LP, giving no opportunity for wave operation. However, the actual short path when considering the combined path through all segments could be as much as 2.25 LP which would be enough to provide full transparent wave operation of stages 106-0 and 106-1. This is because the short path of segment 108-0 could feed into the long path of segment 108-1 which in turn could feed into the long path of segment 108-2 and still form the shortest path across all segments 108-0-108-2. When determining the clocking constraints of stages 106-0 and 106-1, the combined short path(s) through segments 108-0-108-2 are used to find a correct and optimal clocking solution.

While described herein with uniform short paths across all segments to simplify the presentation, it would be obvious to one skilled in the art how to apply the present invention to providing clock control logic and algorithms, and suitable clocking equations, to segments with different short paths. Preferably, combined short path timing is considered for optimal clocking when setting the clocking constraints of a pipeline. The control 130 for programmable select logic 112, 114 is adjusted accordingly to maintain the register stages 106-0-106-1 transparent when possible, clocking the stages opaque as necessary to prevent race conditions.

The location of a potential race condition may be determined cumulatively from an upstream stage that is gated opaque. Race condition locations and dependencies may be determined, for example, when pipeline paths are characterized in short path transient or AC tests, and/or in skew and jitter analysis. The programmable select logic 112, 114 provides customizable control for selecting clocking aggressiveness that may be set at device test based in test results. Once the paths are characterized and/or otherwise known for each particular segment 108-0, 108-1, 108-2, an appropriate truth table, e.g., 130, may be generated. Further, the clock gating may be adjusted for subsequent runtime adaptation, e.g., compensating for parameters collected based on DVFS, voltage and temperature sensors and short path monitors.

As a general rule of thumb, for each pair of distinct adjacent data items (A,B) propagating through a linear pipeline, where A is downstream of B, at least one opaque latch stage must separate A from B in any clock cycle, where in the next clock cycle the short path of B can (would otherwise) overtake the long path of A. So, it is a necessary and sufficient condition for optimum clocking with limited waves for each pair of adjacent data items (A,B), that the latch stage for A is clocked opaque for at least one cycle (and possibly held opaque for multiple cycles) only when B's short path in the next cycle could overtake A's long path.

This may be further generalized for an N segment pipeline, where each segment 108-0-108-(N−1) has a short path clock cycle fraction of sp. Previously, the number of clock pulses required for data item A separated from upstream data item B by n clock cycles is: N for a prior art normally opaque gated pipeline; and determined by floor(N/n) for a transparent gated pipeline, e.g., as taught in U.S. Pat. No. 7,076,682, "Synchronous Pipeline With Normally Transparent Pipeline Stages" to Hans M. Jacobson, assigned to the assignee of the present invention and incorporated herein by reference. By contrast for a preferred N stage normally transparent wave pipeline 100 the number of clock pulses required is determined by floor(N/(n+floor(n*sp/(1−sp)))). So, for example, with N=15, n=3 and sp=0.3, the number of pulses is floor(15/(3+floor (3*0.3/(1−0.3))))=floor(15/(3+floor(0.9/0.7)))=floor(15/4) =3. So in this example, the programmable select logic is set such that every fifth stage clocks opaque between the two waves and is held opaque until the trailing edge of B reaches the opaque gated normally transparent stage.

Figure 2A:
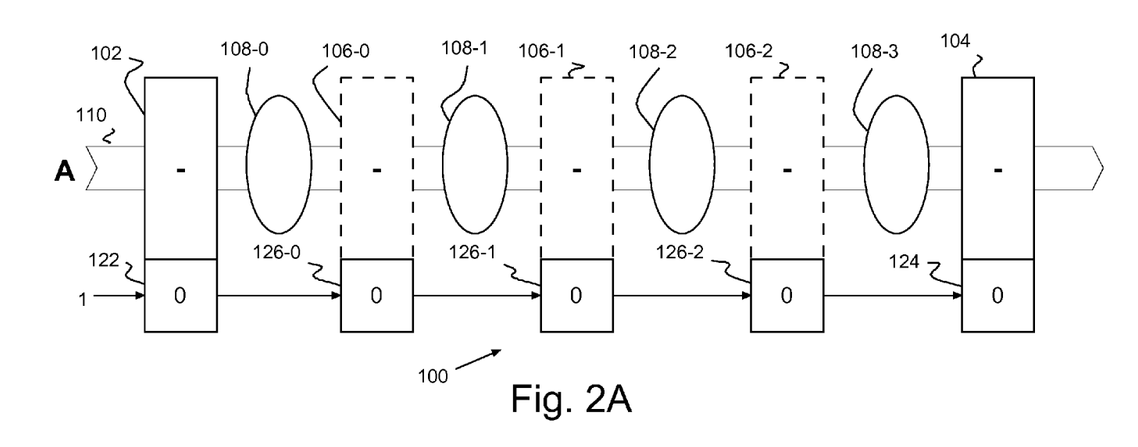
FIGS. 2A-L show an example of back-to-back data propagating through an N segment cross sectional example of a preferred wave pipeline.

FIGS. 2A-L show an example of back-to-back data waves propagating through an N segment cross sectional example of a preferred wave pipeline, e.g., pipeline 100 of FIG. 1A, where N=4 and segment sp is ≧0.65 in this example, with like elements labeled identically. A global clock (not shown) provides a global timing reference. Each of the stages 102, 106-0, 106-1, 106-2, 104 are clocked or selectively gated by a local clock buffer 122, 126-0, 126-1, 126-2, 124, synchronized and derived locally from the global clock. Initially, as shown in FIG. 2A, the pipeline is empty. To facilitate discussion of the invention, with reference to the figures, transparent latches/stages are indicated in dotted lines, opaque latches/stages are indicated in solid lines. A data item traversing the pipeline is indicated by a letter with the lower case indicating short path or locally asynchronous propagation. Upper case indicates long path or stage by stage synchronized propagation. Also, a dash (−) indicates a don't care or a bubble. Capturing of a data item, i.e., at the end of a clock cycle, is indicated by heavy solid lines. A vertical dashed line in a logic segment indicates entry of short path data into the respective segment 108-0, 108-1, 108-2, 108-3.

Figure 2B:
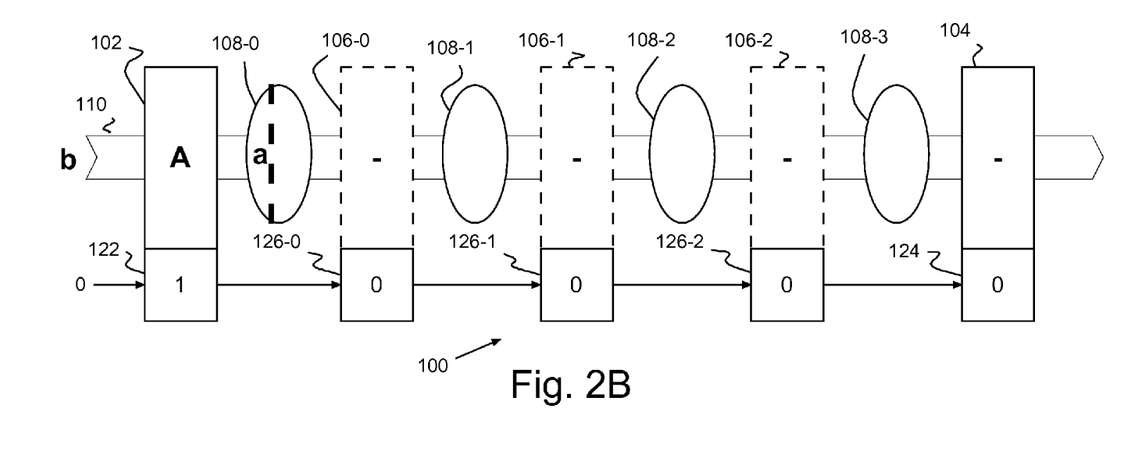

Initially, as shown in FIG. 2A, the pipeline 100 is empty as a data item A arrives as an input 110 to the first normally opaque stage 102. In the first clock cycle as shown in FIG. 2B, the data item A enters the first normally opaque stage 102, it is captured and held stable as the boundary stage 102 becomes opaque. Consequently, boundary stage 102 becomes the state holder for the data item A. Since the internal normally transparent stages 106-0, 106-1, and 106-2 are transparent, data wave A begins to propagate freely through the pipeline 100, entering the first logic segment 108-0 at the beginning of the first clock cycle. The output of the first stage 102 holds data item A valid and a second data item b begins to arrive. Also, the first place holder latch 122 captures the valid bit associated with data item A to indicate the downstream location of the wave A data item.

Figure 2C:
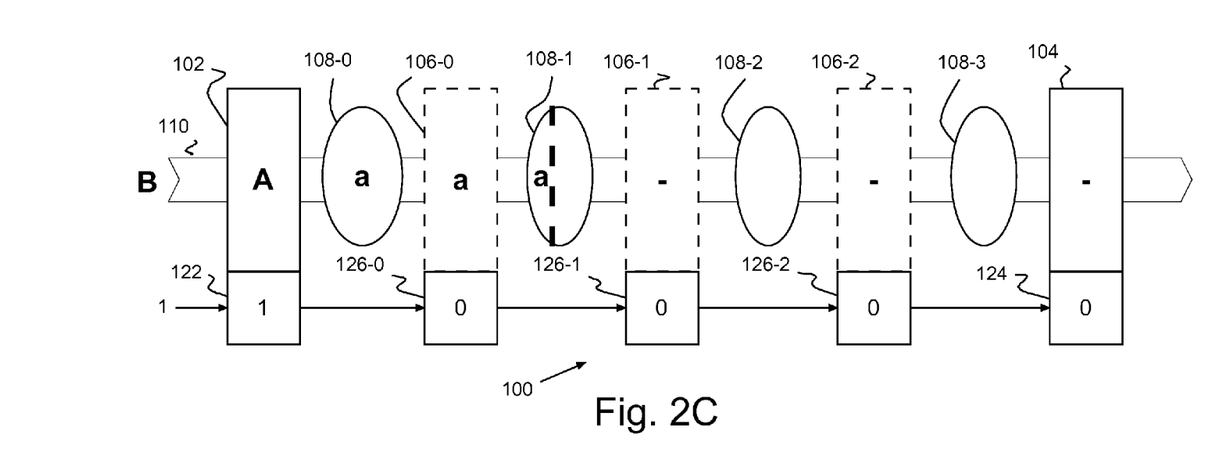

During the first cycle in FIG. 2C, the first stage 102 continues to be held opaque. Thus, the first stage 102 continues providing held first data item A valid at its output. A second data item B arrives at the input to the first normally opaque stage 102. All M bits of data wave A propagate, at the very least, through the logic segment 108-0 after input stage 102 and through the first normally transparent register stage 106-0. Prior to the end of the first cycle, short path data bits a pass beyond that first normally transparent register stage 106-0 and into the second logic segment 108-1.

Since typically, the stage delay is very likely different for each bit through each of the intermediate segments 108-0, 108-1, 108-2 and 108-3, depending upon the individual bit delays, some bits are likely to propagate farther than others (i.e., SP) and, possibly, for a short enough SP (e.g., sp≦0.25) to the output stage 104. However, output stage 104 is normally opaque until the valid stage data bit arrives. So, these early arrival values are not latched in output stage 104, avoiding any risk of metastability occurring or inadvertently propagating invalid data. However, for convenience of discussion herein, the SP delay through each of the intermediate segments 108-0, 108-1, 108-2 and 108-3 is taken to be identically, 0.65 in this example, as noted hereinabove. Thus, at the end of the first cycle, the front end of data wave A has reached and/or entered the second segment 108-1.

Figure 2D:
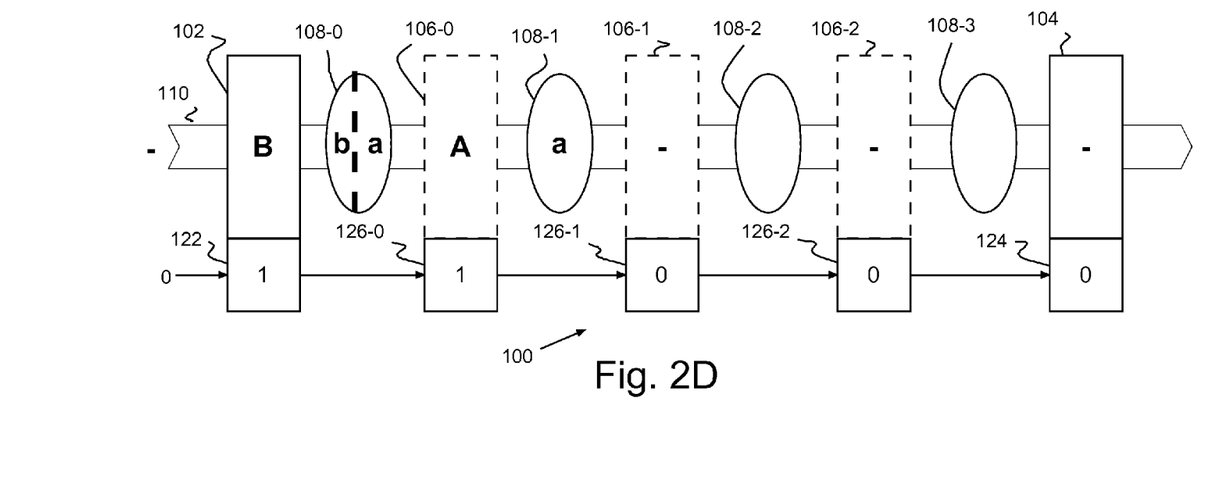

So, at the beginning of the second clock cycle in FIG. 2D, the second data item B latches in the first normally opaque stage 102 and the corresponding first place holder latch 122 captures the associated valid bit. The valid bit associated with data item A latches in the second place holder latch 126-0 to indicate the downstream position of the trailing edge of data wave A at second normally transparent internal latch 106-1. Also, in this second clock cycle, the second data item wave B enters the first segment 108-0, which remains partially occupied by the first data wave A; and, the first data wave A continues propagating through the second segment 108-1.

Figure 2E:
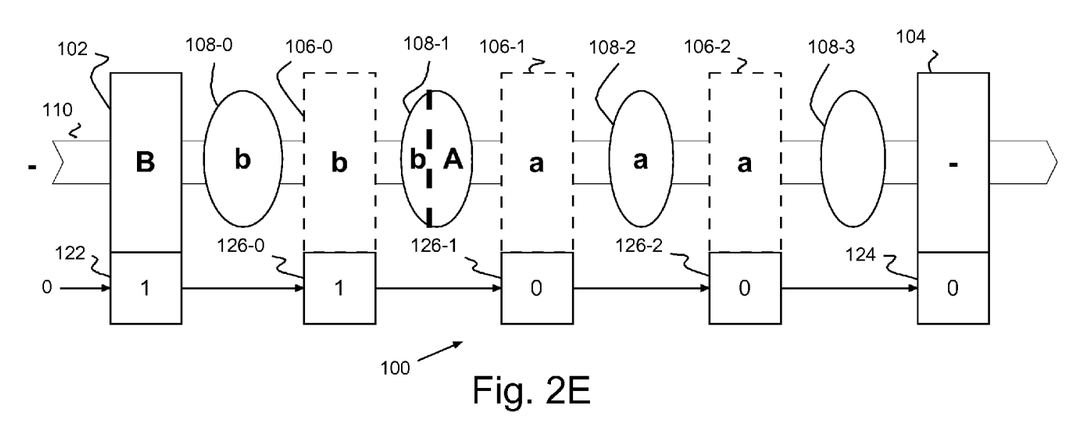

However, since both data waves A and B are separated by a single clock cycle, as shown in FIG. 2E it takes the second wave, B, 0.65 cycles to traverse the SP of the first segment 108-0, pass through the first transparent internal register 106-0 and enter the second segment 108-1. At the end of the clock cycle, the leading edge of second data wave B (SP bits) may be more than 30% through the second segment 108-1, while the trailing edge of the wave is entering the first transparent internal register 106-0. At the same time, the trailing edge of the first data wave A is entering the second normally transparent internal stage 106-1. So by the end of the next clock cycle, without the normally transparent stages 106-0, 106-1, 106-2, a race condition would exist in segment 108-2. The leading edge of second data wave B would be through the third segment 108-2, catching the trailing edge of the first data wave A in the third logic segment 108-2, both arriving at the last stage 104 before the end of the next cycle after that.

Figure 2F:
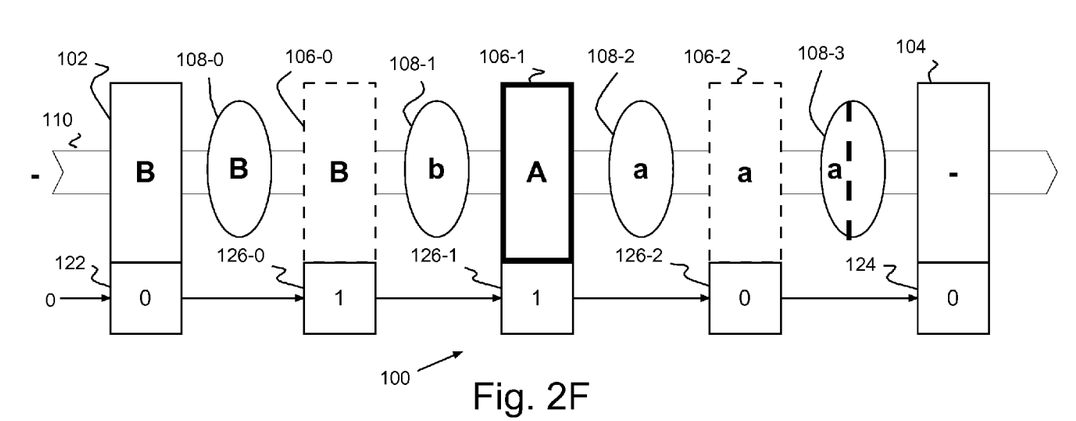
Figure 2G:
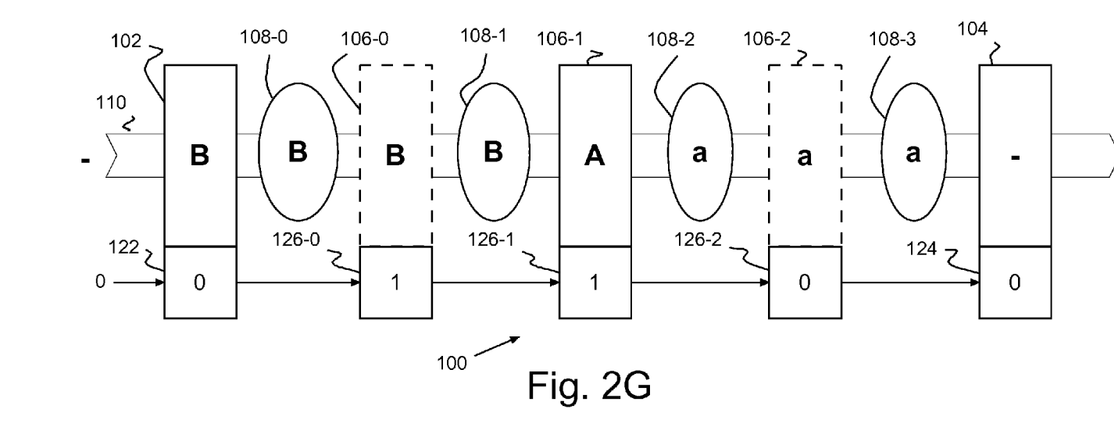

Thus, at the beginning of the third clock cycle in FIG. 2F the second normally transparent internal stage 106-1 latches opaque for 1 cycle, capturing the first data wave A. Latching stage 106-1 opaque at this time prevents the second wave B from passing this opaque stage 106-1, while the first data wave A continues through segment 108-2, stage 106-2 and segment 108-3. The valid bits associated with the two waves A and B also advance to the second and third place holder stages 126-0, 126-1 to indicate the data item A and B positions. During this third clock cycle, as shown in FIG. 2G, the second wave B remains in the first segment 108-0 continues and propagating (LP) through segment 108-1. The first wave A continues propagating uninterrupted, through the last two segments 108-2 and 108-3.

Figure 2H:
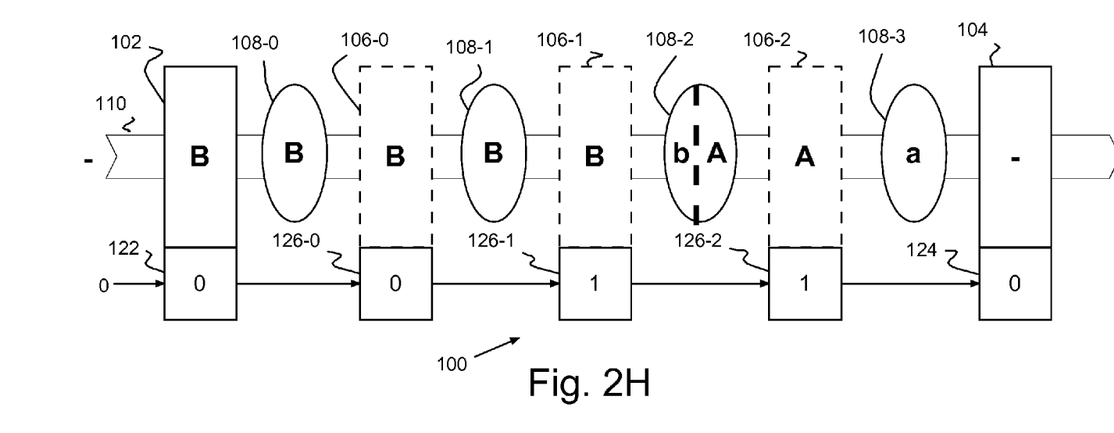
Figure 2I:
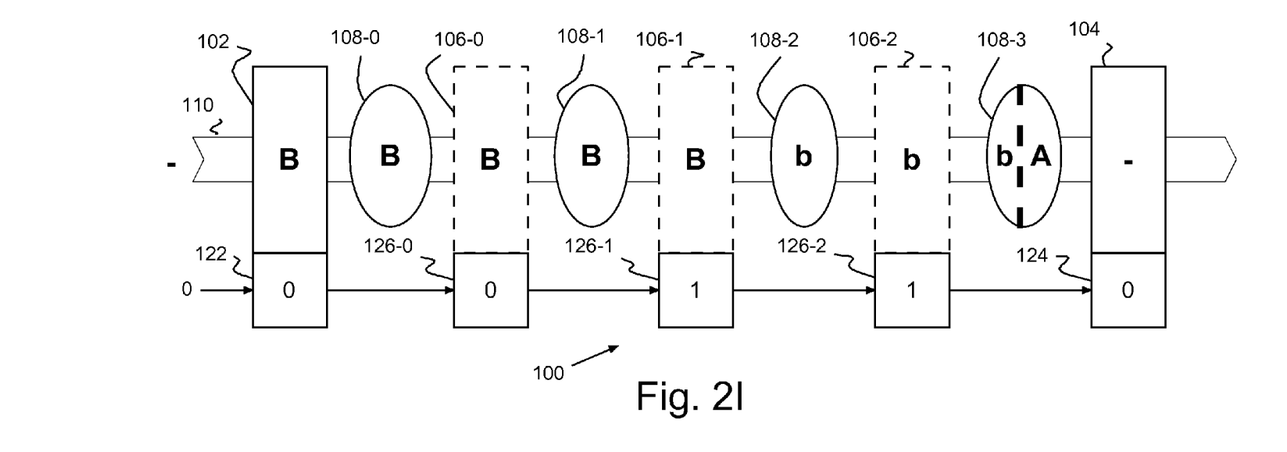

At the beginning of the fourth clock cycle in FIG. 2H internal stage 106-1 is gated to return to its normally transparent state. The first data wave A has fully propagated through internal stage 106-2 and the flattened second wavefront B passes through transparent internal stage 106-1, entering the third logic segment 108-2. Again, the valid bits associated with the two waves A and B advance to the third and fourth place holder stages 126-1, 126-2, indicating the positions of the wave items A and B. During this fourth clock cycle, as shown in FIG. 2I, the second wave B SP bits traverse the third segment 108-2, pass through the third transparent internal register 106-2 and enter the final segment 108-3. Simultaneously, the first wave A completely propagates through the last segment 108-3 and arrives at the input to the last stage 104.

Figure 2J:
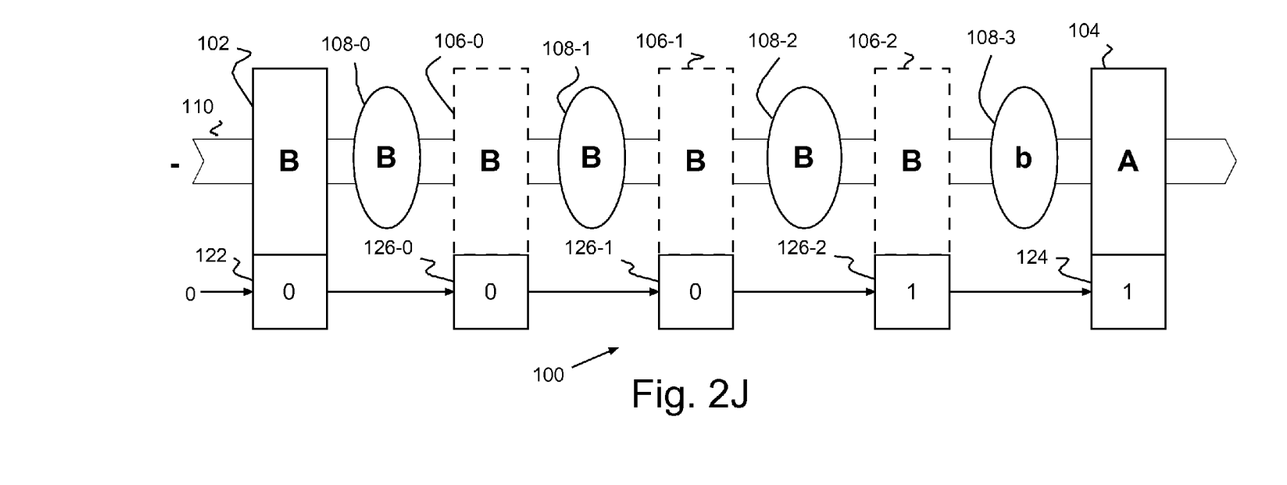
Figure 2K:
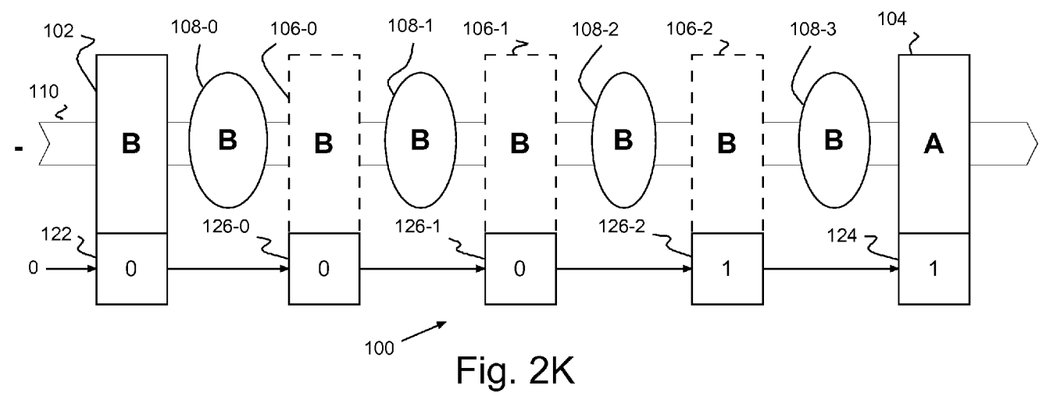
Figure 2L:
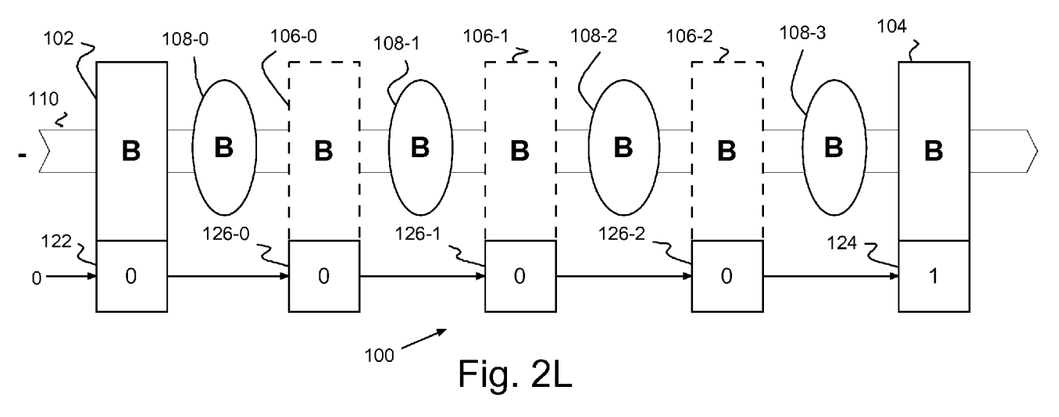

So, before the second wave SP bits b arrive at the input to the last stage 104, the first data item latches in the last stage 104 in the fifth clock cycle in FIG. 2J. The valid bits associated with the two waves A and B advance to the fourth and last place holder stages 126-1, 124, indicating the positions of the wave item B in the pipeline 100 and data item A exits the pipeline 100. During this fifth clock cycle, as shown in FIG. 2K, the second wave B continues with SP bits b traversing the final segment 108-3, and the second wave B arriving at the input to the last stage 104 at the end of the clock cycle. So, as shown in FIG. 2L, the second data item B latches in the last stage 104 in the sixth clock cycle, exiting the pipeline 100. The valid bit advances to the last place holder stage 124. At this time although the pipeline 100 is filled with the second data item B, the contents may be treated as a don't care (–) or bubble.

Figure 3A:
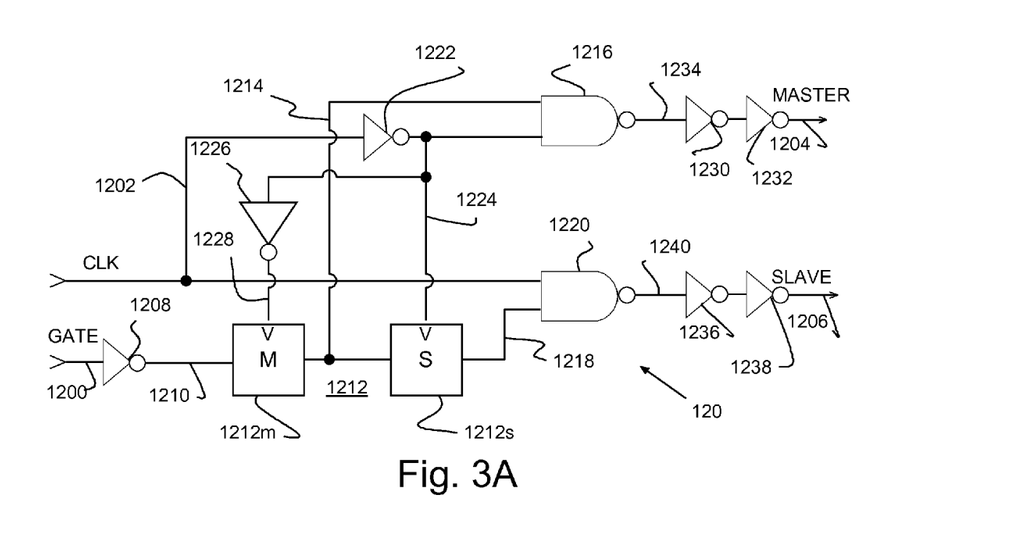
FIGS. 3A-B shows an example of a clock buffer maintaining normally transparent internal pipeline register stages transparent and a corresponding timing diagram for the clock buffer.
Figure 3B:
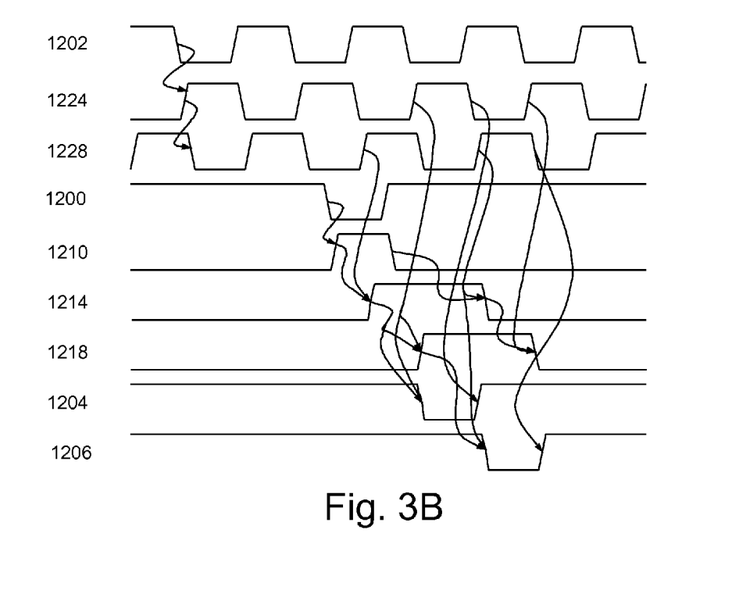

FIG. 3A shows an example of a clock buffer 120 maintaining transparent internal pipeline register stages (e.g., 106-0 and 106-1 in FIGS. 1A and 2A-L) normally transparent and FIG. 3B is a timing diagram for the clock buffer 120. A gate input 1200, e.g., from programmable select logic 112, 114 indicating when a race condition may exist, selectively passes a clock 1202 providing stage master 1204 and slave 1206 gates, e.g., gating a master/slave register selectively opaque. In this example, an inverter 1208 inverts the gate signal 1202. The inverted gate signal 1210 is an input to the master stage 1212m of a master/slave latch 1212, edge triggered in this example. The master stage output 1214 is the input to the slave stage 1212s of a master/slave latch 1212 and one input to NAND gate 1216. The slave stage output 1218 is one input to NAND gate 1220 and the clock 1202 is the other input. Inverter 1222 inverts the clock 1202, which is the other input to NAND gate 1216 and the clock input 1224 to slave stage 1212s. Inverter 1226 reinverts the inverted clock 1224 and provides the clock input 1228 to the master stage 1212m. Series inverters 1230, 1232 buffer the output 1234 of NAND gate 1216. Likewise, series inverters 1236, 1238 buffer the output 1240 of NAND gate 1220.

As can be seen from FIG. 3B, holding the gate input 1200 high, blocks the clock 1202 from passing through the clock buffer 120. Both the master 1204 and slave 1206 gates remain high, gating the respective stage transparent. When the gate input 1200 goes low, a high is presented at the input to the master stage 1212m. The master stage 1212m latches the high on the next rising edge of the reinverted clock 1228. The high out 1214 of the master stage 1212m enables the NAND gate 1216 and presents a high to the input to the slave stage 1212s. Since the inverted clock 1224 is low, the NAND gate output 1234 remains high (not shown) until the inverted clock 1224 rises, as indicated by the stage master gate 1204, which is delayed by the propagation delay of the two series inverters 1230, 1232.

When the inverted clock 1224 rises, the NAND gate output 1234 falls driving the stage master gate 1204 low. A low on the stage master gate 1204 gates master latches in the respective stage opaque. Also, the slave stage 1212s latches the high on the input 1214. The slave stage 1212s latches passing a high out 1218 that enables the other NAND gate 1220. However, since the clock 1202 is low, the NAND gate output 1240 remains high (not shown) until the clock 1202 rises, as indicated by the stage slave gate 1206, also delayed by the propagation delay of the two series inverters 1236, 1238. When the inverted clock 1224 rises at the start of the next clock cycle, the NAND gate output 1234 falls driving the stage slave gate 1206 low, gating slave latches in the respective stage opaque.

At some time prior to the start of that next clock cycle, the gate 1200 returns high, with inverter 1208 driving the input 1210 to the master stage 1212m low. Thus in that next clock cycle, the low passes through both the master stage 1212m and the slave stage 1212s, disabling both NAND gates 1216, 1220. So, at the end of each half clock cycle, the stage master gate 1204 and the stage slave gate 1206 return high and remain high until the next race condition is detected.

Figure 4:
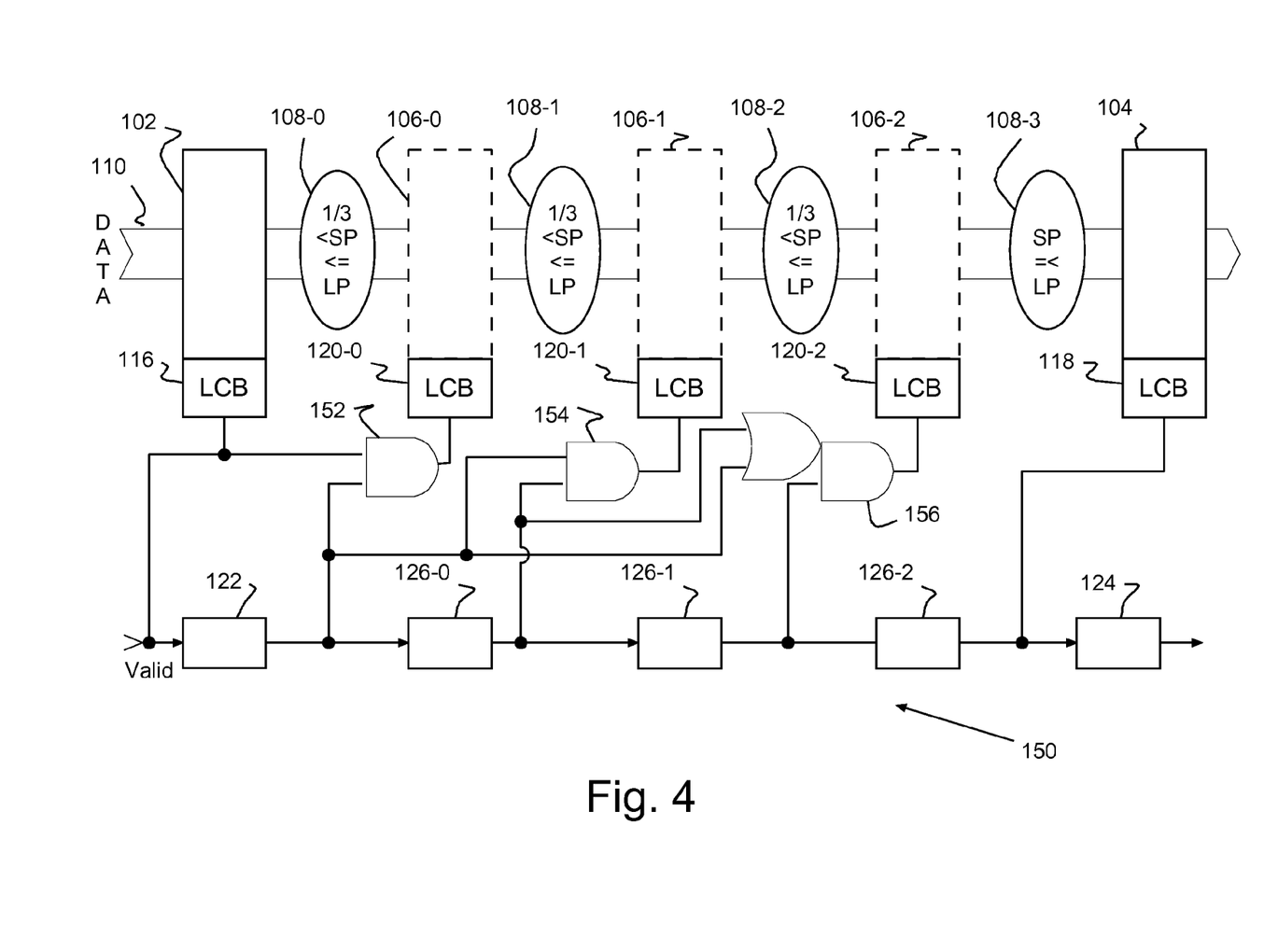
FIG. 4 shows a simple cross sectional example of a preferred normally transparent wave pipeline according to another preferred embodiment of the present invention.

FIG. 4 shows another simple cross sectional example of a preferred normally transparent wave pipeline 150, substantially similar to the embodiment of FIG. 1A with like elements labeled identically. In this example, clock control logic 152, 154, 156 is set at implementation (e.g., at logic design or after place and wire) rather than being programmable, wherein the control logic 152, 154, 156 is selected based on data separation of 2 clock cycles assures 1 cycle of safe operation. This simple three (3) internal stage 106-0, 106-1, 106-2, example, the first two internal stages 106-0, 106-1 are clocked opaque only for back to back data, i.e., valid data in 2 successive clock cycles. The last, $3^{rd}$ internal stage 106-2 is clocked opaque whenever two valid data waves are in the pipeline, i.e., for bubble data and for back to back data. Thus, the clock control logic 152, 154, 156 detects when each/all of the internal stages 106-0, 106-1, 106-2 may remain transparent.

Figure 5:
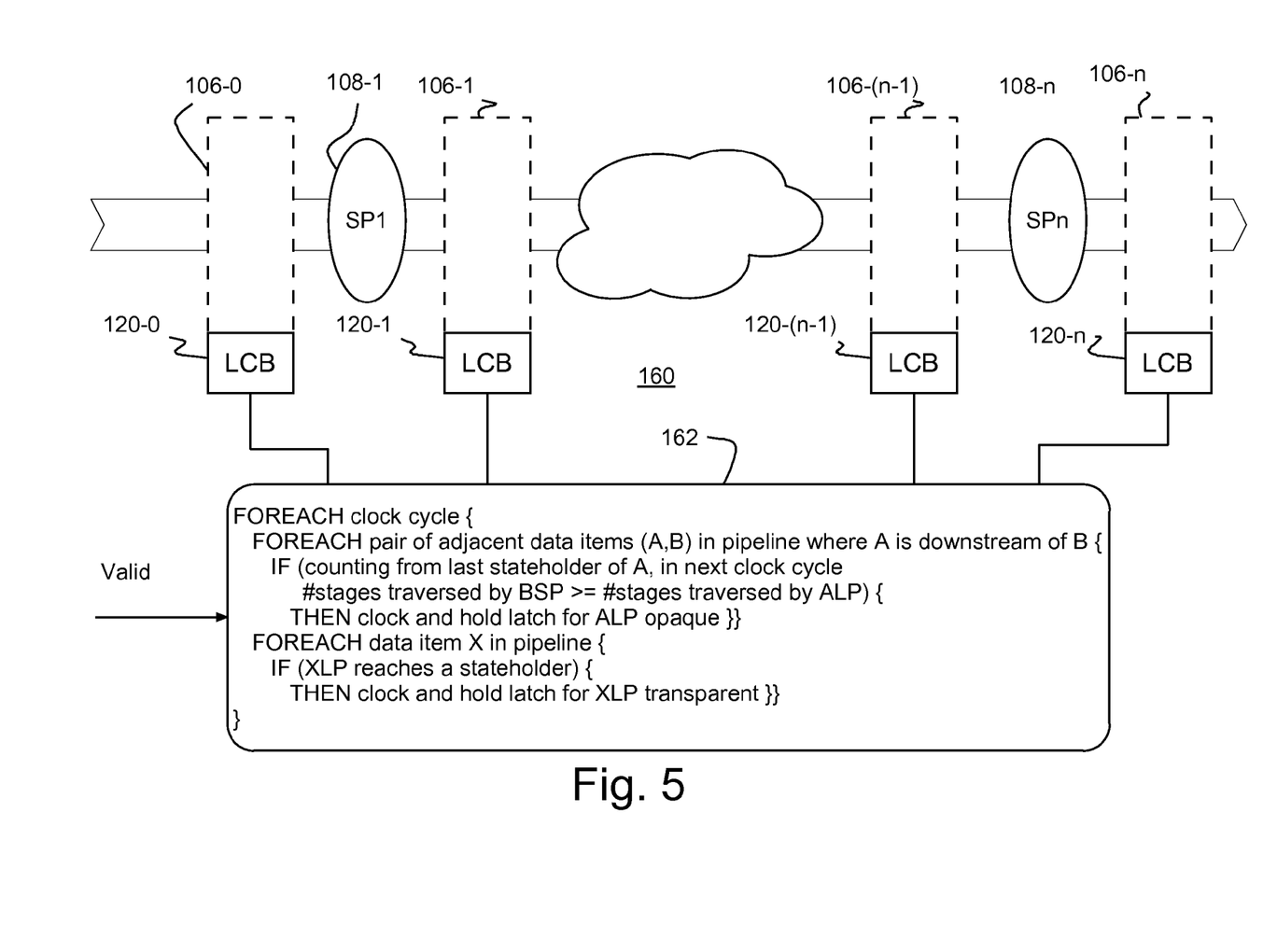
FIG. 5 shows a generalized example of an n-stage embodiment wherein clock selection logic is implemented for each stage to satisfy a particular set of relationships.

FIG. 5 shows a generalized example 160 of an n-stage embodiment of FIG. 1A with like elements labeled identically. In this example, clock selection logic is implemented for each stage to satisfy a particular set of relationships 162, according to the provided pseudo-code. It should be noted that in this example, #stages is counted in fractions of the whole pipeline. Also, in this example, the stages may have n different short paths, SP1, . . . , SPn, previously determined. Alternately, instead of implementing with control 162 with valid data latch logic (e.g., FIG. 1A), the control 162 could be provided using a finite state machine(s) (FSM). In this FSM example, the state machine(s) decide what stages to clock and, possibly, to hold opaque for multiple clock cycles, if necessary.

Figure 6:
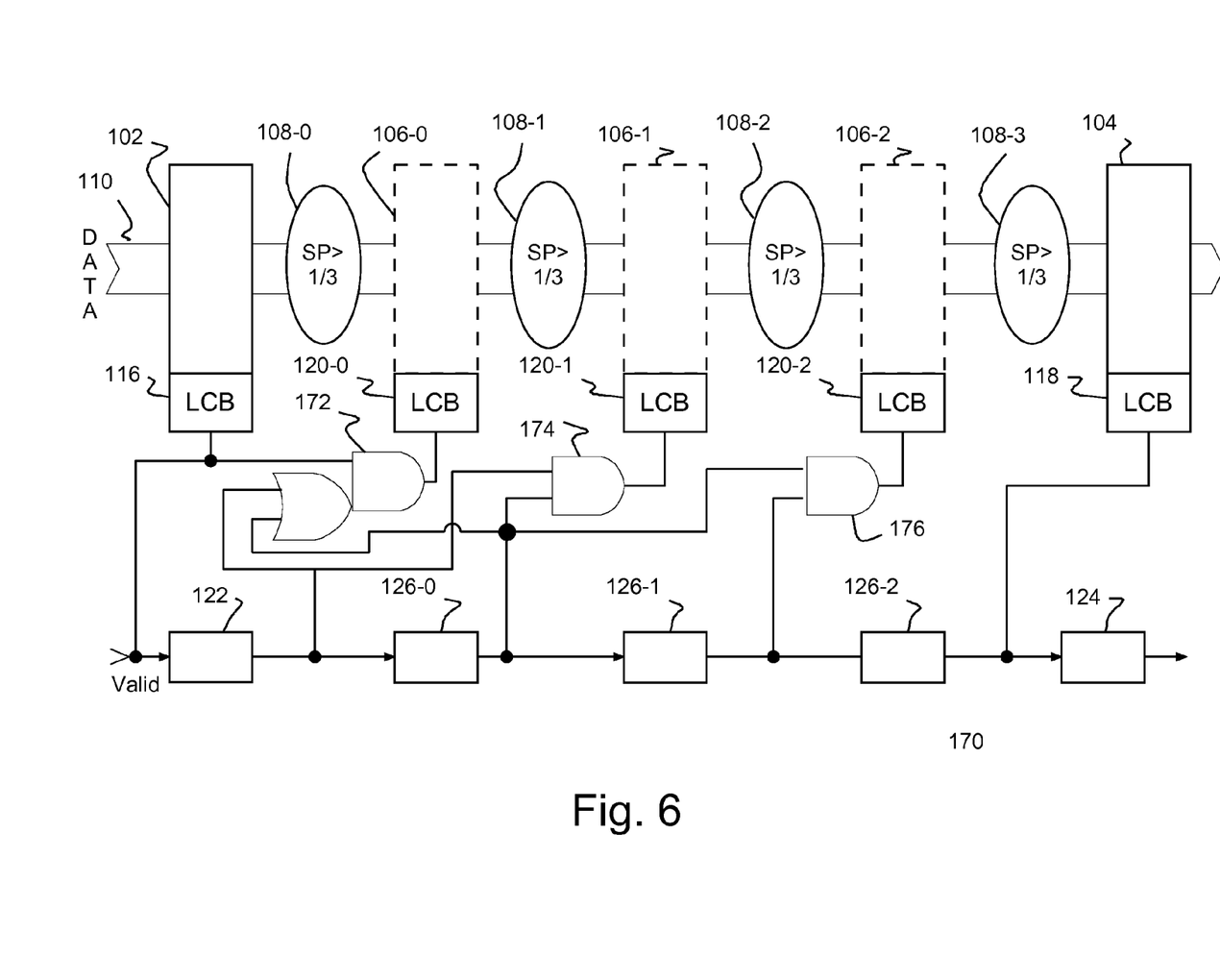
FIG. 6 shows a generalized folded control logic example, wherein a determination is made whether to clock an internal stage clocks opaque based on a mixed look-behind and look-ahead.

FIG. 6 shows a generalized folded control logic example 170 with like elements labeled identically, wherein a determination is made whether to clock an internal stage 106-0, 106-1, 106-2 clocks opaque based on a mixed look-behind and look-ahead. Using a look-ahead in clock logic 172 avoids the need to distribute valid signals over many stages. So in this example, the maximum valid signal distribution distance is reduced from 2 stages to 1 stage 106-0, clocking this stage opaque for back to back data and data items separated by one clock cycle. Control logic 174, 176 only clocks stages 106-1, 106-2 opaque for back to back data items. The look-ahead of this control logic example 170 also provides the designer with an opportunity to more freely choose stages that may be clocked more heavily than others. Thus, the logic may be selected such that less latch intensive stages (fewer latches), 106-0 in this example, clock opaque most frequently; while clocking is minimized in latch intensive stages, 106-2 in this example, to minimize clock power there.

Thus, advantageously, data item waves freely flow through the pipeline as stages are dynamically adapted, on a cycle-by-cycle, stage-by-stage, wave-by-wave basis, without reducing the pipeline operation frequency. Normally transparent internal stages are selectively opaque only where race conditions may occur for closely spaced data item waves and with selection adjusted for the distance between sequential waves. Pipeline short paths are pre-determined, e.g., at chip test and characterization. Internal stages transparent by default, and stage clocks are programmed to avoid race conditions, i.e., upstream wave short path bits catching downstream long path bits. Thus data waves that are sufficiently separated in time (i.e., clock cycles) propagate through the pipeline internal stages being clocked opaque, locally asynchronous but still globally synchronous. Because normally transparent stages are switched opaque only to avoid data races, multiple data items can simultaneously traverse the pipeline at reduced power.

Moreover, because short paths are determined, e.g., at chip test, strict control of short and long path delays in data path logic is unnecessary to avoid data races. Normally transparent latches are clocked opaque to prevent leading edges from one wave from catching trailing edges of another downstream edge. Further, DVFS may be applied to a preferred embodiment pipeline, even though short and long path delays scale differently. DVFS may be used because the opaque stage selection may be programmed dynamically, e.g., during runtime, to accommodate effects of manufacturing variations, skew, jitter, and switching current (dI/dt) noise. Further, because the stage segments are separated by normally transparent path latches, functional testing path logic is no more difficult than any other scan testable logic.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A selectively synchronous wave pipeline segment externally clocked by a global clock, said selectively synchronous wave pipeline segment comprising:
    a plurality of pipeline stages including an input stage, an output stage and one or more internal stages, said input stage and said output stage being normally opaque and said one or more internal stages being normally transparent;
    a plurality of local clock buffers, each local clock buffer selectively providing a local clock to one said corresponding pipeline stage, said input stage and said output stage being selectively clocked transparent and said one or more internal stages being selectively clocked opaque responsive to a corresponding said local clock; and
    a local clock control circuit providing internal stage clock selection control to said one or more internal stages, said internal clock selection control determining whether each internal pipeline stage is gated opaque by said corresponding local clock, multiple pipeline data items passing as data waves between said input and said output stage selectively unclocked, wherein for any sequential data items entering the pipeline and traversing the pipeline in data waves, selected internal registers are gated opaque just prior to race condition locations.

2. A selectively synchronous wave pipeline segment as in claim 1, wherein said one or more internal stages is a plurality of internal stages separating N pipeline segments, wherein for any sequential data items entering the pipeline and traversing the pipeline in data waves, selected internal registers are gated opaque just prior to race condition locations.

3. A selectively synchronous wave pipeline segment as in claim 2, wherein said N pipeline segments have a minimum short path (SP, where sp is the SP delay as portion of a clock cycle) and for any pair of sequential data items entering the pipeline separated by n clock cycles, said local clock control circuit selects gating internal registers opaque according to floor(N/(n+floor(*sp/(1−sp)))).

4. A selectively synchronous wave pipeline segment as in claim 1, wherein said one or more internal stages is a plurality of pipeline stages and adjacent items entering said pipeline in two successive clock cycles traverse portions of said pipeline as data waves, internal registers between said portions being selectively gated opaque between the adjacent data waves, at least one of said portions including one or more transparent internal registers.

5. A selectively synchronous wave pipeline segment as in claim 1, wherein said one or more internal stages each include a place holder latch indicating whether valid data is in a respective stage.

6. A selectively synchronous wave pipeline segment as in claim 5, wherein for each stage said local clock control circuit is programmable and monitors valid data indications for other pipeline stages and downstream stalls.

7. A selectively synchronous wave pipeline segment as in claim 2, wherein each internal register is clocked opaque between adjacent items entering said pipeline in two successive clock cycles, whenever the minimum short path delay (sp) is less than ½ of a clock cycle.

8. A selectively synchronous wave pipeline segment as in claim 2, wherein the first internal register remains transparent between adjacent items entering said pipeline, whenever the minimum short path (sp) is greater than ½ of a clock cycle.

9. A selectively synchronous wave pipeline segment as in claim 8, wherein absent any downstream stalls, the first and second internal registers remain transparent between adjacent items entering said pipeline, whenever the minimum short path (sp) is greater than ⅔ of a clock cycle.

10. An integrated circuit (IC) including a plurality of logic paths, at least one of said plurality of logic paths including a selectively synchronous wave pipeline, said selectively synchronous wave pipeline comprising:
    an input stage, said input stage being normally opaque, sequential data items entering the pipeline through the input stage separated by one or more clock cycles;
    an output stage, said output stage being normally opaque;
    a plurality of normally transparent internal stages, each between two of N pipeline logic segments, data items traversing the pipeline in data waves and exiting through said output stage;
    a plurality of place holder latches, each place holder latch receiving a data edge indicator indicating whether valid data is in a corresponding stage;
    a plurality of local clock buffers, each local clock buffer selectively providing a local clock to one said corresponding pipeline stage, said input stage and said output stage being selectively clocked transparent and said internal stages being selectively clocked opaque by a corresponding said local clock buffer; and
    a local clock control circuit providing internal stage clock selection control to said plurality of internal stages responsive to timing select signals, said local clock control circuit selectively allowing pipeline data items to pass unclocked as data waves between said input stage and said output stage, and selectively gating opaque selected internal registers just prior to identified race condition locations for sequential data waves.

11. An IC as in claim 10, wherein said internal clock selection control is programmable and determines from valid data indications and programmed said select signals whether each said internal pipeline stage is gated opaque responsive to said corresponding local clock.

12. An IC as in claim 11, wherein said N pipeline segments have a minimum short path (SP, where sp is the SP delay as portion of a clock cycle) and for any pair of sequential data items entering the pipeline separated by n clock cycles, said programmable local clock control circuit is programmed to select gating internal registers opaque according to floor(N/(n+floor(*sp/(1−sp)))).

13. An IC as in claim 11, wherein adjacent items entering said pipeline in two successive clock cycles traverse portions of said pipeline as data waves, internal registers between said portions being selectively gated opaque between the adjacent data waves, at least one of said portions including one or more transparent internal registers.

14. An IC as in claim 11, wherein each internal register is clocked opaque between adjacent items entering said pipeline in two successive clock cycles, whenever the minimum short path (sp) is less than ½ of a clock cycle.

15. An IC as in claim 14, wherein the first internal register remains transparent between adjacent items entering said pipeline, whenever the minimum short path (sp) is greater than ½ of a clock cycle.

16. An IC as in claim 15, wherein the first and second internal registers remain transparent between adjacent items entering said pipeline, whenever the minimum short path (sp) is greater than ⅔ of a clock cycle.

17. An integrated circuit (IC) with a plurality of logic paths including one or more selectively synchronous wave pipeline, each selectively synchronous wave pipeline comprising:

an input stage, said input stage being a normally opaque stage, sequential data items entering the pipeline through the input stage separated by one or more clock cycles;

an output stage, said output stage being a normally opaque stage;

a plurality of normally transparent internal stages separating N pipeline logic segments, data items traversing the pipeline in data waves and exiting through said output stage;

a plurality of place holder latches, each place holder latch receiving a data edge indicator indicating whether valid data is in a corresponding stage;

a plurality of local clock buffers, each local clock buffer selectively providing a local clock to one of said corresponding pipeline stages, said input stage and said output stage being selectively clocked transparent and each of said internal stages being selectively clocked opaque by a corresponding said local clock buffer; and a local clock control circuit providing internal stage clock selection control to said plurality of internal stages, said local clock control circuit selectively allowing pipeline data items to pass unclocked as data waves between said input and said output stage, and selectively gating opaque selected internal registers just prior to identified race condition locations for sequential data waves.

18. An IC as in claim 17, wherein said internal clock selection control is programmable and determines from valid data indications and programmed timing select signals whether each said internal pipeline stage is gated opaque responsive to said corresponding local clock.

19. An IC as in claim 18, wherein said N pipeline segments have a minimum short path (SP, where sp is the SP delay as portion of a clock cycle) and for any pair of sequential data items entering the pipeline separated by n clock cycles, said programmable local clock control circuit is programmed to select gating internal registers opaque according to floor(N/(n+floor(*sp/(1−sp)))).

20. An IC as in claim 18, wherein adjacent items entering said pipeline in two successive clock cycles traverse portions of said pipeline as data waves, internal registers between said portions being selectively gated opaque between adjacent data waves, at least one of said portions including one or more transparent internal registers.

21. An IC as in claim 18, wherein each internal register is clocked opaque between adjacent items entering said pipeline in two successive clock cycles, whenever the minimum short path (sp) is less than ½ of a clock cycle.

22. An IC as in claim 21, wherein the first and second internal registers remain transparent between adjacent items entering said pipeline, whenever the minimum short path (sp) is greater than ⅔ of a clock cycle.

23. A selectively synchronous wave pipeline segment externally clocked by a global clock, said selectively synchronous wave pipeline segment comprising:

a plurality of pipeline stages including an input stage, an output stage and a plurality of internal stages, said input stage and said output stage being normally opaque and said plurality of internal stages being normally transparent;

a plurality of local clock buffers, each local clock buffer selectively providing a local clock to one said corresponding pipeline stage, said input stage and said output stage being selectively clocked transparent and said internal stages being selectively clocked opaque responsive to a corresponding said local clock; and a programmable local clock control circuit providing internal stage clock selection control to said plurality of internal stages, said internal clock selection control determining responsive to timing program select signals whether each said internal pipeline stage is gated opaque by said corresponding local clock, multiple pipeline data items passing as data waves between said input and said output stage selectively unclocked.

24. A selectively synchronous wave pipeline segment as in claim 23, wherein said plurality of internal stages separates N pipeline segments, and wherein for any sequential data items entering the pipeline and traversing the pipeline in data waves, selected internal registers are gated opaque just prior to race condition locations.

25. A selectively synchronous wave pipeline segment as in claim 24, wherein said N pipeline segments have a minimum short path (SP, where sp is the SP delay as portion of a clock cycle) and for any pair of sequential data items entering the pipeline separated by n clock cycles, said local clock control circuit selects gating internal registers opaque according to floor(N/(n+floor(*sp/(1−sp)))).

* * * * *